(No Model.) 2 Sheets—Sheet 2.
J. R. THOMAS.
PLANING MACHINE.
No. 483,970. Patented Oct. 4, 1892.
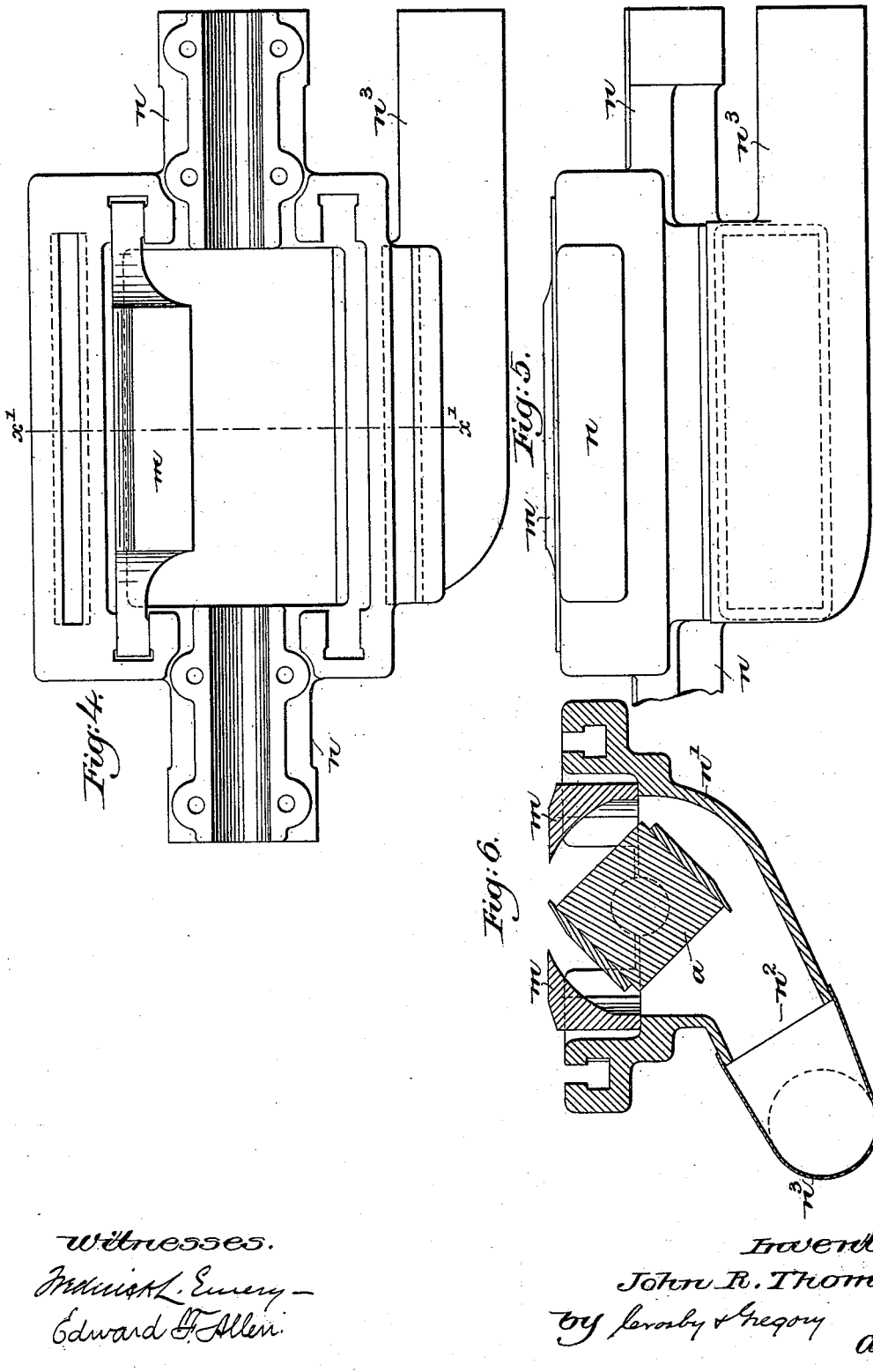
Witnesses.
Frederick L. Emery
Edward F. Allen
Inventor.
John R. Thomas,
by Crosby & Gregory
Attys.

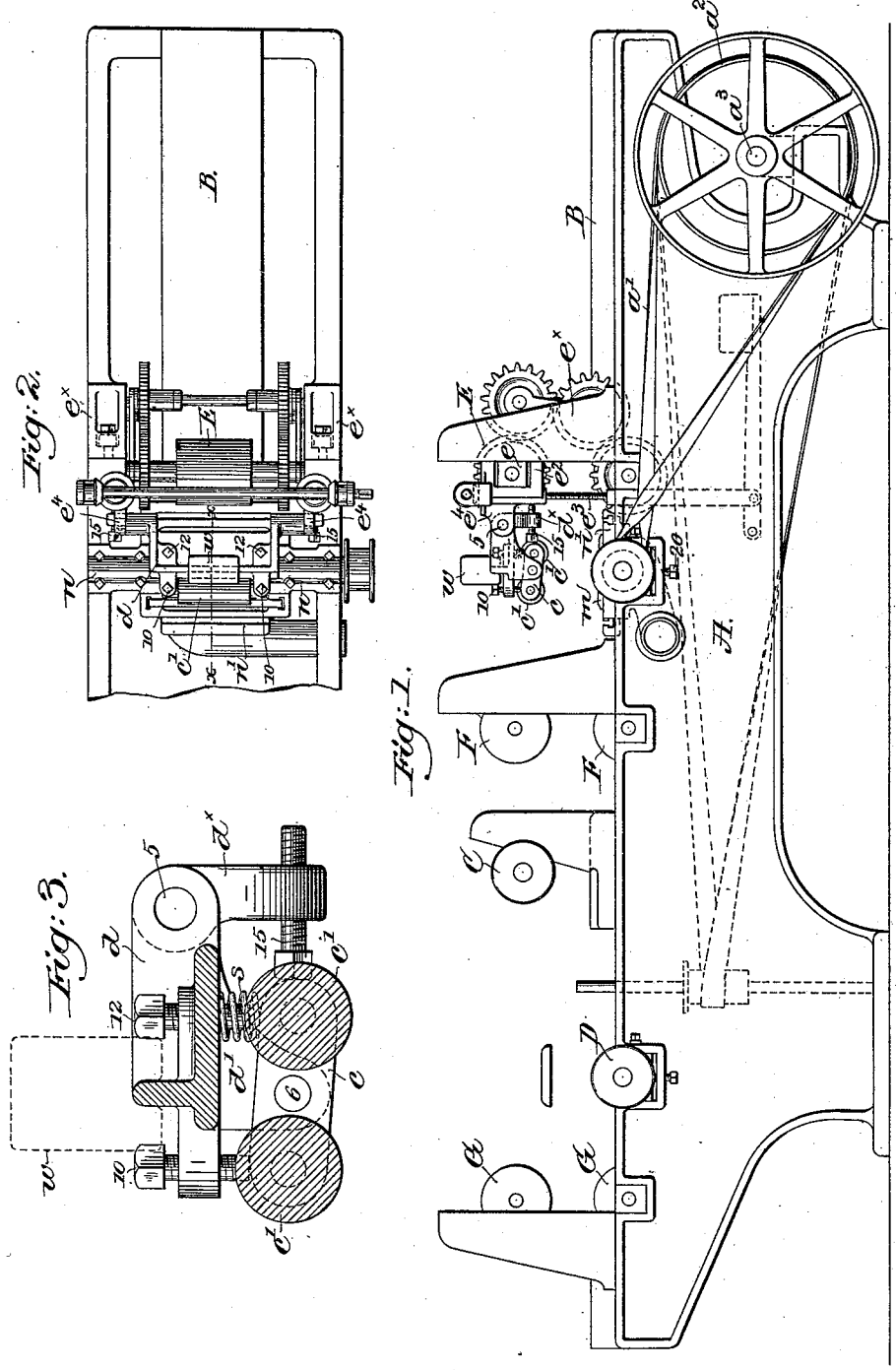

UNITED STATES PATENT OFFICE.

JOHN R. THOMAS, OF BOSTON, MASSACHUSETTS, ASSIGNOR TO THE S. A. WOODS MACHINE COMPANY, OF SAME PLACE.

PLANING-MACHINE.

SPECIFICATION forming part of Letters Patent No. 483,970, dated October 4, 1892.

Application filed November 17, 1890. Serial No. 371,710. (No model.)

*To all whom it may concern:*

Be it known that I, JOHN R. THOMAS, of Boston, county of Suffolk, State of Massachusetts, have invented an Improvement in Planing-Machines, of which the following description, in connection with the accompanying drawings, is a specification, like letters and figures on the drawings representing like parts.

This invention has for its object to improve the construction of wood-planing machines, whereby better work may be produced.

Planing machines of the class referred to as generally constructed have the under cutter located beyond or back of the upper cutter to thus remove the under cutter away from the driving-belts, feed-rolls, and gearing in order to give more convenient access to the under-cutter head for sharpening, readjustment, and change of cutting-knives or for the insertion of molding or beading knives, which is frequently necessary. A planing-machine having its cutters arranged in this manner is suitable for a certain class of work; but when lumber, especially hard-wood lumber, used extensively for flooring, moldings, &c., is kiln-dried, it is warped or kinked more or less, its surface is left irregular and uneven, and the knots do not shrink uniformly with the surrounding wood, but project slightly above the surface, so that when a board or stick of such lumber is fed into the planing-machine under the upper cutter and between it and the usual surface plate or bed the board will be lifted slightly by the knots or other projections in the upper surface toward the upper cutter, causing the latter to cut deeper at such points than at others, leaving the upper surface full of depressions. As the board or stick having this uneven upper surface moves on to the under cutter, and between it and its presser-plate, the latter, acting upon the uneven upper surface, will cause the same to be pressed with greater or less force upon the under cutter, according as the board or stick is thicker or thinner, causing the board or stick to partake of the uneven or irregular shape previously given to the upper surface. This uneven pressure of the board or stick upon the under cutter causes the latter to make either a deeper or more shallow cut, according as the board or stick is pressed upon it with greater or less force, the said under cutter thus making depressions in the under surface of the board or stick, which lie between and are the counterparts of the depressions in the upper surface, thus turning out a stick undulatory and of uneven thickness. To obviate this trouble, I have provided the machine with a preparatory under cutter to rough off or true up the under surface of the board or stick by removing any knots or projections therefrom before it arrives at the surface-plate below the upper cutter, and the under surface of the board or stick thus previously made smooth and [true passing over the surface-plate below the upper cutter causes the latter to cut a uniformly true and even upper surface, which when it subsequently passes below the presser arranged above the finish under cutter will cause the latter to also cut a uniform and even under surface, the board or stick thus turned out being perfectly straight and even and free from the undulations usually found in such. This preparatory cutting-cylinder is set in a vertically-adjustable housing, the adjustment of which varies the depth of the cut, and the housing has a shaving-spout which is led out through the side of the machine to thus direct the shavings to one side and prevent them from falling on the usual side-head belts located inside of or under the machine. The machine contains a work-presser, which bears upon the top of the board above the preparatory cutting-cylinder. This presser is composed of two rolls mounted in an auxiliary frame pivoted in a yoke hinged to the feed-roller housing. Thus the presser may bear upon the surface of the board, although of unequal thickness.

The particular features of which my invention consists will be pointed out in the claims.

Figure 1 represents in side elevation a sufficient portion of a planing-machine to illustrate this invention; Fig. 2, a partial top or plan view thereof; Fig. 3, an enlarged sectional detail taken on the dotted line $xx$, Fig. 2, to be described; Figs. 4 and 5, top and rear views, respectively, of the cutting-cylinder housing; and Fig. 6, a vertical section taken on the dotted line $x'$ $x'$, Fig. 4.

Referring to the drawings, the bed A, table B, upper and lower cutting-cylinders C D, and feed-rolls E F G are and may be of any usual and well-known construction—such, for instance, as shown in Patent No. 374,283, dated December 6, 1887—and the working parts are driven in usual manner.

The bed A between the feed-rollers E F is recessed to receive the journal-bearings $n$, formed upon either end of the housing $n'$, (see Figs. 4 and 5,) the said journal-bearings receiving the shaft or journals carrying the preparatory cutting-head $a$, driven, as represented, by a belt $a'$ from a pulley $a^2$, fast on the usual driving-shaft $a^3$.

The journal-bearings $n$ and housing $n'$ are adjustably supported in the frame, as represented, by the set-screws 20. (See Fig. 1.) The housing $n'$ at its under side is provided with an outlet $n^2$, leading into a spout $n^3$, which extends laterally and passes through the side frame of the machine, as represented in Figs. 1, 3, and 5, to thus direct all shavings away from the usual side-head belts, located beneath the machine and indicated by dotted lines, Fig. 1, and the said housing is fitted to receive the usual chip-breakers $m$.

The upper feed-roll E is journaled in the boxes $e$, supported in the housings $e^2$, made adjustable vertically in the stands $e^x$ by means of the usual threaded shafts $e^3$, all of which are substantially as shown in my patent, No. 374,283, referred to.

The vertically-adjustable feed-roll housings $e^2$ are provided with longitudinally-extended ears $e^4$, between which is hinged on pivots 5, the yoke $d$, also provided with depending ears or lugs $d'$, to which are pivoted centrally at 6 the levers $c$, in the ends of which are journaled the presser-rolls $c'$, the said levers constituting an auxiliary frame.

The yoke $d$ is shaped to receive the adjusting or limiting screws 10 12, which limit the tipping movement of the rolls $c'$ about their pivotal points 6. (See Fig. 3.) The said limiting-screws 10 12 are preferably set to allow slight tipping of the rolls $c'$ in either direction, springs $s$ being interposed between the yoke $d$ and the inner ends of the levers $c$, said spring either encircling the screw 12, as represented, (see Fig. 3,) or placed adjacent thereto, to thereby keep the inner roll $c'$ depressed slightly below the outer roll, as shown. A weight $w$ is placed upon the yoke $d$ to keep the presser rollers $c'$ in contact with and bearing upon the upper side of the board or stick being planed, the downward movement of the yoke, however, being limited by limiting-screws 15, threaded in the arms $d^x$, depending from the said yoke, the said limiting-screws acting against the housings $e^2$.

The presser-rolls $c'$ are moved vertically with the housings $e^2$ and the upper feed-roll E, to adjust for various thicknesses of work, and at the same time the presser-rolls $c'$ are free to tip slightly in either direction independently of the feed-roll E, to thus adjust themselves to any inequalities in the surface of the board or stick being planed and upon the upper surface of which they bear, and at the same time both rollers and the yoke $d$, which carries them, may move vertically, to compensate for varying thicknesses of the stock being planed. The springs $s$ act to throw the inner roll down slightly lower than the outer one, as shown, so that as the stock is fed into the machine it will be acted upon by that roll before reaching the preparatory cutter, and the rolls are thereafter forced by said springs to follow all inequalities in the surfaces of the stock, and particularly when a new board or stick is fed into the machine, the said springs $s$ then acting through the rolls $c'$ to keep the abutting ends of the two boards down upon the chip-breakers $m$ even though the two boards be unequal in thickness, which is frequently the case. By first subjecting the board or stick to the action of this preparatory cutter upon its under side all knots and other projections are removed, so that when it reaches the upper main cutter its under side will move smoothly and evenly over the surface-plate beneath the cutting-cylinder, which leaves the board or stick with a smooth upper surface free from any nicks or depressions.

The arrangement of cutters herein shown and described is also extremely useful in other ways—as, for instance, when it is desired to mold or otherwise cut an uneven under surface on the board the plane knives to cut the flat surface or surfaces may be applied to the preparatory cutting-cylinder, and the irregular knife or knives to cut the molding-bead may be applied to the second under-cutting cylinder, thus obviating any careful fitting or adjustment between the knives, which is necessary where both the plane and irregular or curved knives have to be fitted to a single cutting-cylinder, the latter operation requiring great nicety of fitting and adjustment.

I do not desire to limit this invention to the particular construction and arrangement of the various parts herein shown, as it is evident the same may be varied without departing from the scope of this invention, and it is also evident the invention may be applied to other kinds of planing-machines than the one represented.

I claim—

1. In a planing-machine, the combination, with the cutter $a$, upper and lower feed-rolls, and adjustable housings for the upper feed-roll, of a yoke pivoted to said housings, levers $c$, centrally pivoted to said yoke and carrying at their opposite ends the parallel presser-rolls $c'$, to be acted upon in succession by the stock, a spring interposed between the yoke and one of the rolls to keep the same normally depressed, and a stop on the yoke to limit the depression of the said roll by the spring, substantially as described.

2. The under cutting-cylinder $a$, combined with a trough-shaped housing therefor having closed ends and bearings forming part of said ends in which the said under cutting-cylinder rests and rotates, a longitudinal outlet for said housing, and a spout connected with the said outlet and leading to one side through the side frame of the machine, and chip-breakers resting in seats formed in said housing, substantially as described.

3. The combination, with the housings $e^2$, of the yoke $d$, hinged thereto, set-screws 10 12, levers $c$, rollers $c'$, and springs $s$, arranged to operate substantially as described.

4. The combination, with the housings $e^2$, of the yoke $d$, hinged thereto, the rollers $c'$, carried thereby, the weight $w$, and limiting-screws 15, to operate substantially as described.

5. In a planing-machine, the combination, with the feed-rolls E, of the presser-rolls $c'$, movable vertically with and independently of said feed-rolls, and limiting-screws to regulate the independent movement of the presser-rolls, and the cutting-cylinder $a$, substantially as described.

6. In a planing-machine, a fixed preparatory under cutter or irregular-surface reducer to act upon the stock throughout its entire length, and a fixed under cutter located at a distance therefrom to act on the face of the material previously acted upon by the preparatory cutter, combined with an upper cutter to act on the opposite side of the material at a point between the fixed preparatory and under cutters, whereby the knots or projections along the entire under side of the material are first trued and then the upper and lower sides of the material, respectively, as and for the purpose set forth.

In testimony whereof I have signed my name to this specification in the presence of two subscribing witnesses.

JOHN R. THOMAS.

Witnesses:
W. N. ARNSDEN,
H. L. RUSSELL.